Aug. 6, 1968　　　L. B. LARSSON ET AL　　　3,395,637
LOAD CARRIER FOR A LOG SKIDDING SULKY
Filed Jan. 18, 1967　　　　　　　　　　　　　　4 Sheets-Sheet 1
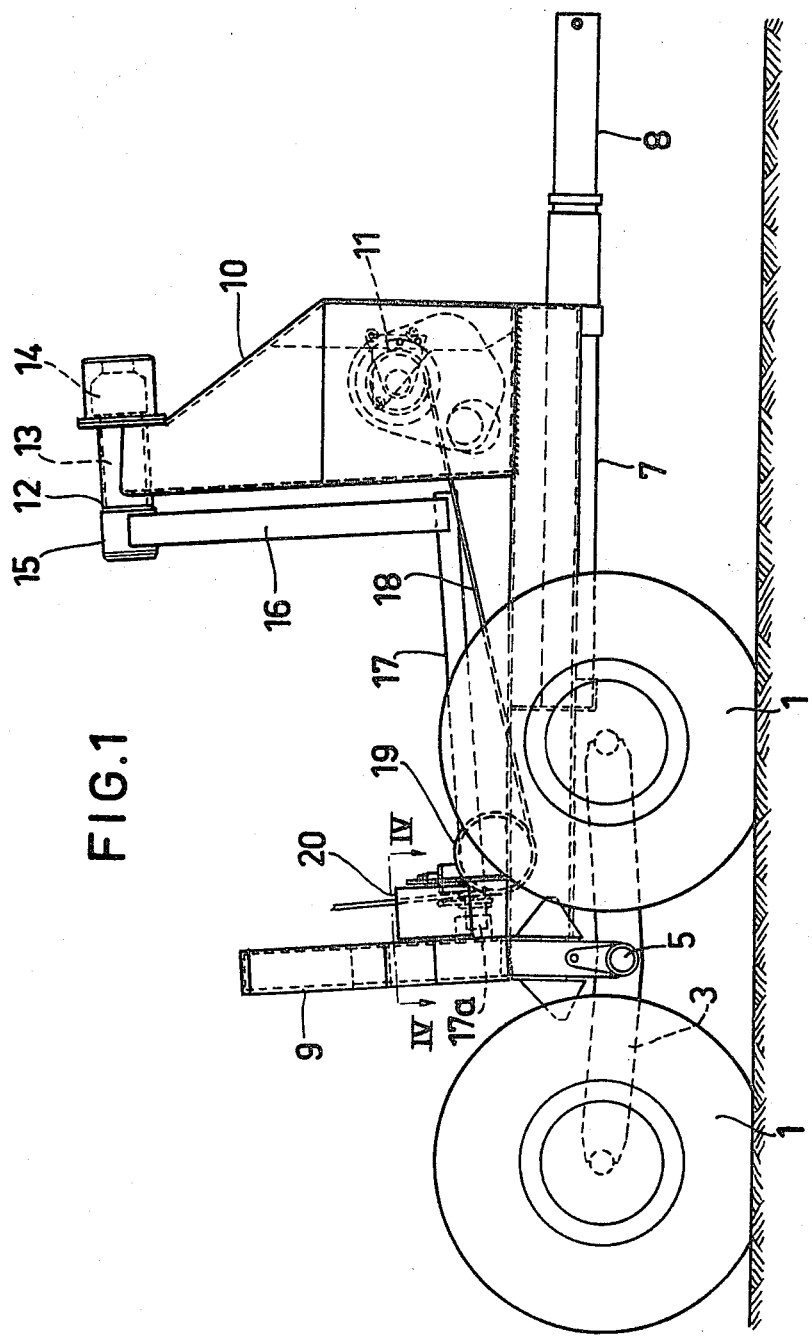
INVENTORS
Lars Bengt Larsson, and
Gustav Ingemar Johansson;
By Pierce, Scheffer & Parker
their Attorneys Aug. 6, 1968  L. B. LARSSON ET AL  3,395,637
LOAD CARRIER FOR A LOG SKIDDING SULKY
Filed Jan. 18, 1967  4 Sheets-Sheet 2
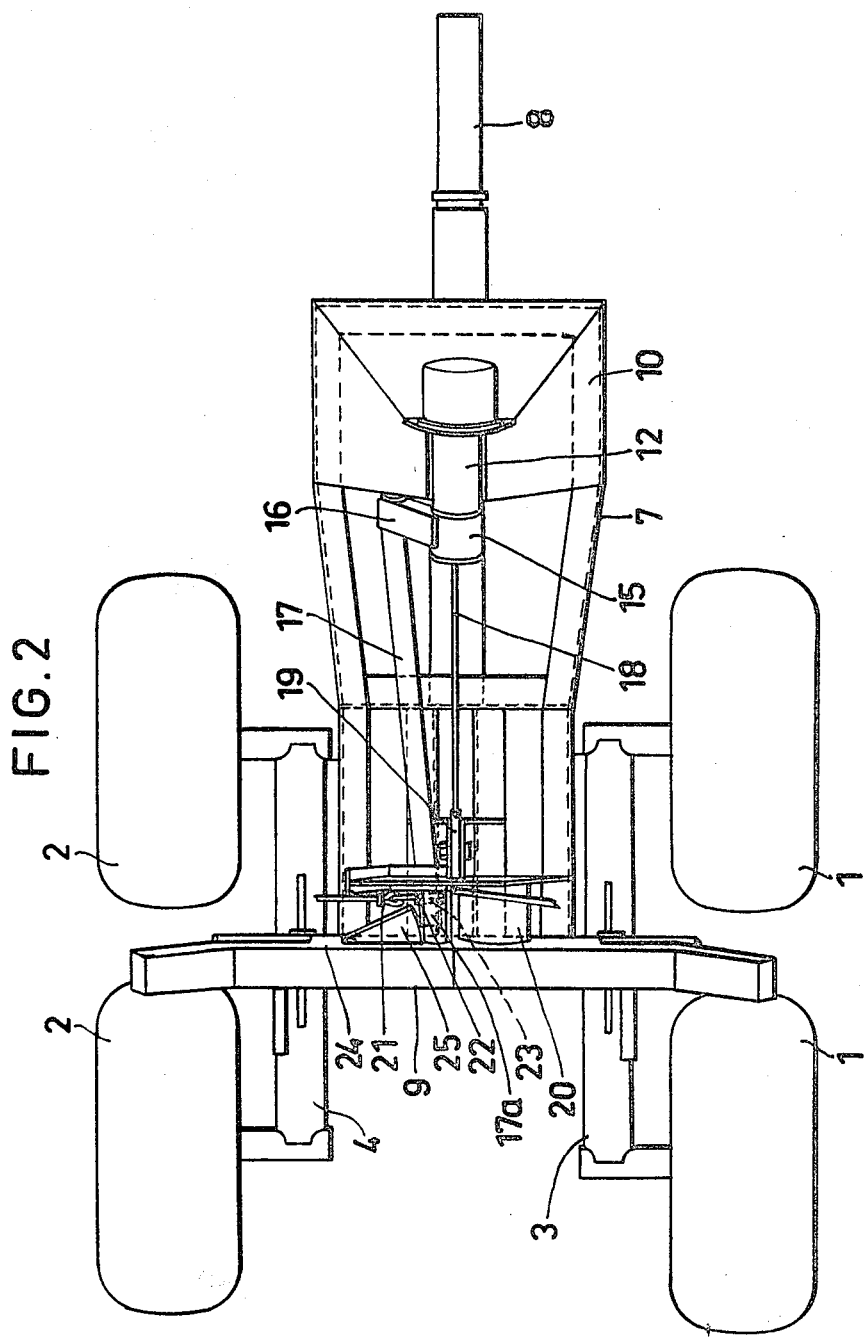
INVENTORS
Lars Bengt Larsson and
Gustav Ingemar Johansson,
BY Pierce Scheffler & Parker
their Attorneys

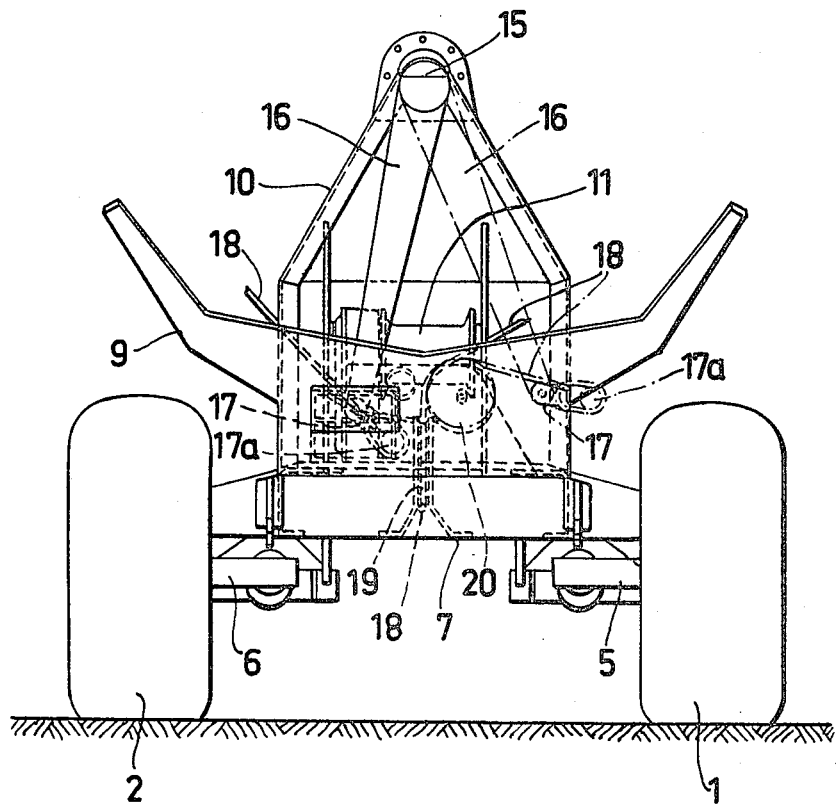

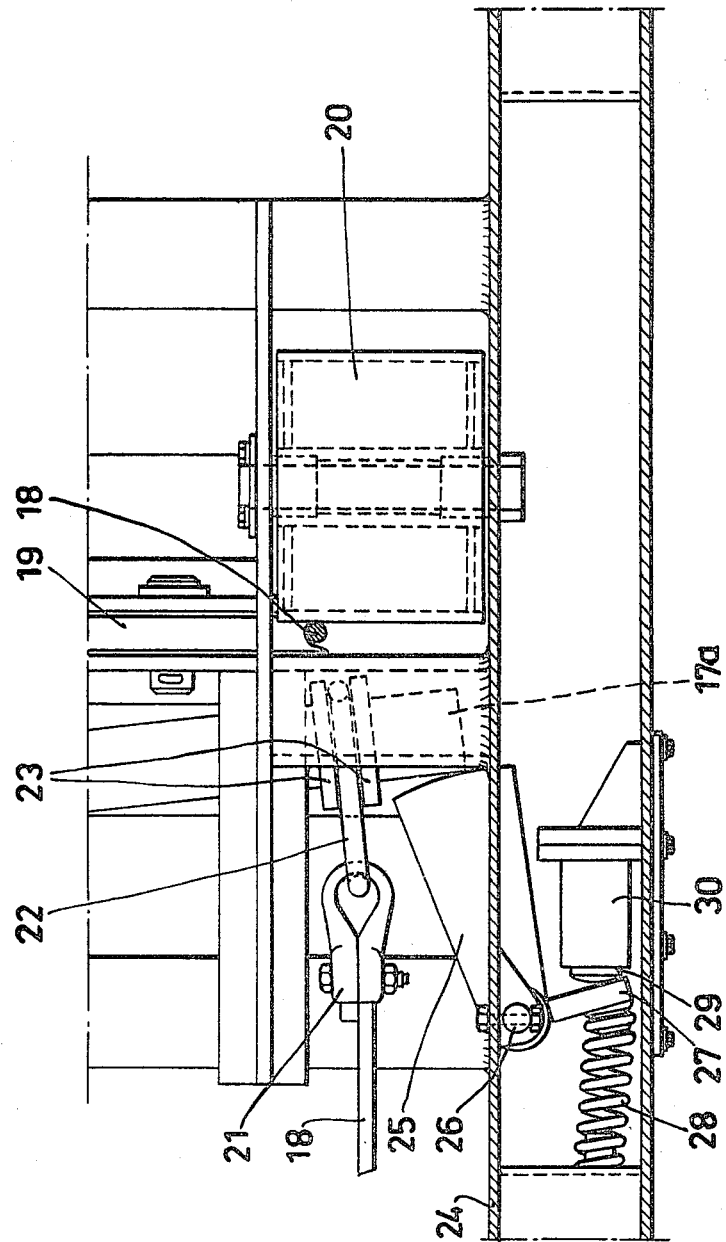

United States Patent Office 3,395,637
Patented Aug. 6, 1968

3,395,637
LOAD CARRIER FOR A LOG SKIDDING SULKY
Lars Bengt Larsson and Gustaf Ingemar Johansson, Soderhamn, Sweden, assignors to Ostbergs Fabriks AB, a Swedish joint-stock company
Filed Jan. 18, 1967, Ser. No. 610,102
Claims priority, application Sweden, Jan. 18, 1966, 627/66
6 Claims. (Cl. 100—212)

ABSTRACT OF THE DISCLOSURE

A load carrier for a log skidding sulky of the bogie type, having a rotatable shaft extending in parallel with the longitudinal axis of the sulky, includes an arm rotatable about said shaft, a jib backwardly projecting from said shaft, and means for enfolding a log bundle, one end of which rests on a support member of the carrier, including a cable and means for tightening the cable about the end of a log. The log bundle can swing laterally with respect to the sulky.

---

This invention relates to a load carrier for a log skidding sulky.

The conventional constructions comprise wings which are hinged on both sides of the supporting portion of the carrier. During the loading the wings are inclined upwardly-outwardly, and subsequent to the completed loading the wings are swung inwards over the log bundle and clamp the bundle against the supporting portion.

The aforesaid arrangement involves several shortcomings. One of these shortcomings is that the loading operation which normally is carried out by skidding the logs to a place to the side of the carrier and thereafter to swing the butt end up onto the supporting portion, is rendered considerably more difficult by the wings, because the butt end must be lifted over the wings. A further—and more serious—disadvantage is that for a safe holding of the logs the wings must develop such a great clamping force, that the logs are fixed rigidly in the carrier. Due to the fact that the other end of the log bundle is dragged on the ground, the possibility of turning the unit of a pulling vehicle and the sulky is limited to a high degree.

The aforesaid and other disadvantages are eliminated, in that the load carrier according to the invention is given the characterizing features set forth in claim 1.

The invention is described in a greater detail in the following, reference being had to the accompanying drawings whereon:

FIGS. 1, 2 and 3 show a lateral view, a horizontal view and a rear end view respectively of a log skidding sulky equipped according to the invention, and FIG. 4 shows a detail view along the line IV—IV in FIG. 1.

The log skidding sulky shown on the drawing is of the bogie type comprising bogie wheel pairs 1 and 2. The bogie arms 3 and 4 respectively have their centres 5 and 6 respectively on the lower surface of a sulky frame 7 close to the rear end thereof. A pull rod 8 projects from the front end of the frame for being connected to a pulling vehicle, such as a tractor (not shown).

On the upper surface of the frame is mounted a load carrier, with its supporting portion 9 placed substantially straight above the pivot axis 5, 6 of the bogie. The said portion is given the usually somewhat concave shape, as appears from FIG. 3, for receiving the ends of a log bundle.

The sulky frame 7 carries at its front end a stand or casting 10 which in its lower portion includes a motor-driven winch 11 and in its upper portion a cylindric bearing portion 12. The latter comprises a shaft 13 (FIG. 1) which at one end is connected with a motor-driven rotary member 14, preferably a hydraulic rotator adapted to be driven from a hydraulic source which also feeds the winch 11. The shaft 13 carries at its other end a nave portion 15 from which projects radially an arm 16 which at its end is provided with a jib 17 projecting backwards (i.e., directed to the rear end of the sulky). The said end 17a terminates a short distance from the supporting portion 9 of the carrier, as appears from FIGS. 1 and 2.

A cable 18 runs from the winch 11 below a pulley 19 which is placed before the supporting portion 9 and mounted in the frame 8. From the pulley 19 the cable runs upwards to a deflecting roller 20 mounted perpendicularly (in the horizontal plane) to the pulley 19 and having its circumference somewhat below the outline of the supporting portion (see FIG. 3). Subsequent to the thus obtained deflection to the direction transverse to the sulky, the cable 18 continues to the end 17a of the jib 17 where, as shown in FIGS. 2 and 4, the cable hooks by a cramp thimble 21 in a link 22 which encloses the jib end 17a and is held fixed thereon with the help of surrounding stop rings 23.

FIG. 4 also shows a mechanism for retaining the jib end 17a in the position shown, and an arrangement for abolishing the effect of the said mechanism. In the front wall 24 of the supporting portion 9 of the load carrier (see also FIG. 2) a slot is provided through which projects a triangular portion of a tongue 25 which on the inside of the wall 24 is mounted about a shaft 26 and provided with an arm 27. On this arm acts on one side a spring 28 tending to turn the tongue 25 aside, and on the other side the piston 29 of a single-acting hydraulic cylinder 30 which can overcome the spring force and, thus, turn the tongue inwards.

The arrangement described above operates briefly as follows:

The starting position for loadng is when the arm 16 is in its position subsequent to its turning downwards in clockwise direction, as shown by dash-dotted lines in FIG. 3. In this position the cable 18 is below the carrying surface of the supporting portion 9, as is apparent from the figure. When the felled logs are being loaded, with their ends resting on the said portion, the winch 11 is disengaged and the rotator 14 is fed. The rotator swings the arm in the anti-clockwise direction, whereby its jib 17 uncoils the cable 18 from the winch and sweeps the cable over the end of the log bundle until the arm has reached its end position shown by full lines in FIG. 3. During the last phase on the way to the said end portion, as appears from FIG. 4 (also FIG. 2), the jib with its end 17a has pressed aside the tongue 25 against the action of the spring 28, which tongue subsequent to having passed the said end again snaps up and locks the jib in the final position shown in the said figures.

The winch 11 is now fed for coiling the cable which thereby tightens the previously loose cable loop about the log bundle, preferably by a pulling force of up to 3 tons. Hereby the logs originally spread over the entire supporting portion are driven from the sides inwards to the centre to form a bundle which is firmly held together. Due to the fact that this bundle rests substantially only on the relatively plane part of the supporting portion, against which portion it is pressed by the embracing cable without contacting the upwardly turned end parts of the supporting portion, the log bundle can be swung laterally to a great extent, i.e., the entire unit has a very good swinging capacity.

The unit can now be moved to the next loading place where at first the winch 11 is disengaged, so that the cable 18 slackens. Thereafter the single-acting hydraulic cylinder 30 (FIG. 4) is fed which thereby overcomes the compression force of the spring 28 and turns the tongue 25 out of the position in which it locks the jib end 17a. The winch is fed for coiling, so that the cable 18 swings the arm 16 now being free in clockwise direction to its starting position according to the dash-dotted lines in FIG. 3 whereafter the loading is carried out in the way already described.

It deserves observation that the loading can take place in an optimal manner from any side of the load carrier without being impeded by any upwardly inclined clamping wings, because the cable (as well as the jib and the arm) which substitute the clamping wings are entirely moved aside from the loading space. Observation further is to be paid to the self-tightening action of the cable—for example in connection with shiftings of the logs during the transport—which self-tightening action has no correspondence in the conventional arrangement of clamping wings.

The invention is not restricted to the embodiment described above, but different modifications can be imagined within the scope of the invention, particularly by replacing certain details with details equivalent as to their function. The drive power, furthermore, for the winch and the member which rotates the arm can be arranged in a way different from that indicated above, and it also may be replaced by a purely manual control. The invention, of course, is not restricted to the shown bogie embodiment either, but the principles may be applied to any skidding vehicle operating under similar conditions.

What we claim is:

1. A load carrier for a log skidding sulky, comprising a cradle at the rear of the sulky for supporting one end of a log bundle, an upstanding arm located towards the front of the sulky having one end rotatably mounted about a shaft substantially parallel with the longitudinal axis of the sulky, a rearwardly projecting jib having one end attached to the other end of the upstanding arm, a cable from a winch attached to the other end of the jib, drive means for rotatably sweeping the arm, jib and cable about the longitudinal axis of the sulky in opposite directions between two extreme positions, whereby the cable can be wrapped or unwrapped about said one end of a log bundle supported on the cradle, the winch being adapted to apply pressure to the cable to secure the log bundle on the cradle or in the alternative to provide for slack in the cable for unwrapping of the cable from the bundle.

2. The load carrier according to claim 1, whereof the swing movement between the two extreme positions comprises an angle exceeding 180°, a control device including a deflecting roller to direct the cable from the winch to a point near the end of the jib in its starting position for effecting the cable to embrace the log bundle for the greater part of its circumference.

3. The load carrier according to claim 1, which comprises a locking device for locking the arm in its final position.

4. The load carrier according to claim 3, which comprises a control device for abolishing the action of the locking device.

5. The load carrier according to claim 3, whereof the locking device comprises a spring-loaded snapping member adapted first to be pressed aside by the jib and thereafter to snap in when the arm approaches its final position.

6. The load carrier according to claim 4, whereof the control device comprises a hydraulic means for pressing aside the snapping member against the action of the spring.

References Cited

UNITED STATES PATENTS

| | | | |
|---|---|---|---|
| 1,793,545 | 2/1931 | De Rocher | 214—523 |
| 2,691,451 | 10/1954 | Westfall | 214—92 |
| 2,284,119 | 5/1942 | Boehm | 100—212 |

ALBERT J. MAKAY, *Primary Examiner.*